(12) United States Patent
Scholl et al.

(10) Patent No.: US 6,287,376 B1
(45) Date of Patent: Sep. 11, 2001

(54) HYDROPHOBIC, OXIDIC OR SILICEOUS FILLERS AND THEIR USE

(75) Inventors: Thomas Scholl, Bergisch Gladbach; Hermann-Josef Weidenhaupt, Pulheim; Heinrich Königshofen, Bergisch-Gladbach; Peter Wendling, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/251,077

(22) Filed: Feb. 16, 1999

(30) Foreign Application Priority Data

Feb. 23, 1998 (DE) ................................ 198 07 629

(51) Int. Cl.$^7$ ................................ C08K 9/02; C08K 9/04; C08L 21/00
(52) U.S. Cl. ................................ 106/491; 106/490; 524/155
(58) Field of Search ................................ 106/490, 491; 524/155

(56) References Cited

U.S. PATENT DOCUMENTS

| | | | |
|---|---|---|---|
| 2,736,669 | 2/1956 | Goebel | 117/54 |
| 2,801,185 | 7/1957 | Iler | 106/288 |
| 3,842,111 | 10/1974 | Meyer-Simon et al. | 260/448.2 E |
| 3,873,489 | 3/1975 | Thurn et al. | 260/33.6 AQ |
| 3,978,103 | 8/1976 | Meyer-Simon et al. | 260/448.8 R |
| 3,997,356 | 12/1976 | Thurn et al. | 106/228 Q |
| 4,076,550 | 2/1978 | Thurn et al. | 106/228 Q |
| 4,210,459 * | 7/1980 | Williams et al. | 106/308 |
| 4,359,342 * | 11/1982 | Stacy et al. | 523/216 |
| 4,514,231 | 4/1985 | Kerner et al. | 106/309 |
| 4,704,414 | 11/1987 | Kerner et al. | 523/213 |
| 5,116,886 * | 5/1992 | Wolff et al. | 523/209 |
| 5,780,531 | 7/1998 | Scholl | 523/213 |
| 6,068,694 * | 5/2000 | Bernard et al. | 106/490 |

FOREIGN PATENT DOCUMENTS

| | | |
|---|---|---|
| 0 531 842 * | 3/1993 | (DE) . |
| 0 631 982 | 1/1995 | (EP) . |
| 890 600 | 6/1998 | (EP) . |
| 98/47955 | 10/1998 | (WO) . |

* cited by examiner

*Primary Examiner*—Anthony Green
(74) *Attorney, Agent, or Firm*—Joseph C. Gil; Noland J. Cheung

(57) ABSTRACT

Hydrophobic, oxidic and/or siliceous fillers obtainable by treating an oxidic and/or siliceous filler with 0.1 to 50 parts by weight, per 100 parts by weight of filler, with an adduct of sulfur and unsaturated primary and/or secondary alcohols with 3 to 60 carbon atoms at temperatures of 20 to 250° C., wherein the adduct has been obtained by reacting 1 to 10 moles of sulfur per mole of double bonds in the alcohol.

5 Claims, No Drawings

HYDROPHOBIC, OXIDIC OR SILICEOUS FILLERS AND THEIR USE

FIELD OF THE INVENTION

The present invention relates to hydrophobic, oxidic or siliceous fillers and the use of these fillers to produce rubber mixtures and vulcanisates. The rubber mixtures and vulcanisates which contain the hydrophobic, oxidic or siliceous fillers are particularly suitable for producing highly reinforced, abrasion-resistant moulded items, in particular for producing tyres which have a low rolling resistance and high resistance to abrasion.

BACKGROUND OF THE INVENTION

The treatment of surfaces of fillers to improve filler/matrix bonding in thermoplastic and thermoset composites and in filled rubber systems is known. Thus in U.S. Pat. Nos. 4,514,231 and 4,704,414 the treatment of siliceous fillers with polysulfidic silylethers, in particular bis-(triethoxysilyl-propyl) tetrasulfide, is described. According to DE 2 141 159 and 2 255 577, the surface modification of untreated fillers can be performed in situ by adding polysulfidic silylether to a mixture of the corresponding rubbers and untreated filler. The disadvantage of using polysulfidic silylethers to improve the filler/matrix bonding is the costly method of preparation of the polysulfidic silylethers and the associated high cost of raw materials. U.S. Pat. Nos. 2,736,669 and 2,801,185 describe processes for rendering silica hydrophobic in which silicas are treated with alcohols. The silicas treated in this way, however, do not exhibit an improved reinforcing effect in a rubber matrix.

EP 0 631 982 describes a special method for preparing silica aggregates and their use for reinforcing elastomers. As is also specified in EP 0 631 982, the silica aggregates which are obtained may be provided with additional functional groups in a subsequent reaction. A number of chemical compounds with functional groups is used for treating the silica aggregates obtained in order to introduce a variety of functional groups. The silicon-free compounds for treating silica aggregates, listed in particular in column 8 of the European patent application mentioned above, do not produce sufficient improvement in the reinforcing fillers with regard to the physical properties of the rubber mixtures prepared therefrom, in particular when they are intended for the preparation of highly reinforced, abrasion-resistant moulded items.

SUMMARY OF THE INVENTION

The object of the present invention is to provide activated, hydrophobic, oxidic or siliceous fillers from readily accessible raw materials which produce a substantial improvement in filled rubber mixtures in particular with regard to the low abrasion and low rolling resistance, high wet skid resistance and low mixing viscosity which are important when producing tyres.

DETAILED DESCRIPTION OF THE INVENTION

The present invention therefore provides new oxidic and/or siliceous fillers, obtainable by treating an oxidic and/or siliceous filler with 0.1 to 50 parts by weight, per 100 parts by weight of filler, of an adduct of sulfur and unsaturated primary and/or secondary alcohols with 3 to 60 carbon atoms at temperatures of 20 to 250° C., wherein the adduct has been obtained by reacting 1 to 10 moles of sulfur and/or the corresponding amount of sulfur-providing compound per mole of double bonds in the alcohols.

The oxidic or siliceous fillers according to the invention are preferably subjected to a treatment with the adducts of sulfur and unsaturated primary and/or secondary alcohols mentioned above have preferably a concentration of physically-bonded water of $\leq 4$ wt. %, preferably $\leq 3$ wt. %, in particular $\leq 1$ wt %, with respect to the total amount of filler.

The adducts of sulfur and unsaturated alcohols used to prepare the oxidic or siliceous fillers according to the invention have a concentration of bonded sulfur of 10 to 65 wt. %, in particular 15 to 40 wt %.

The hydrophobic oxidic or siliceous fillers in the present invention have a methanol wettability of 1 to 55, preferably 5 to 40. The methanol wettability is determined as follows according to the invention: 200 mg of silica and 50 ml of water are placed in a 250 ml round-bottomed flask with a magnetic stirrer. The hydrophobic silica remains on the surface of the water. Then the tip of a graduated pipetted filled with methanol is immersed into the liquid phase (in order to avoid direct contact with the silica) and the methanol is allowed to flow out slowly. The mixture is stirred with the magnetic stirrer so that a vortex is produced in the liquid. Methanol is added until the solid substance becomes wetted. This is the case when the silica is no longer distributed over the surface of the liquid phase (now containing methanol) and the clear film-free liquid is visible. The result for methanol wettability, expressed as wt. % of methanol in the methanol/water mixture, is calculated from the formula:

Methanol wettability (in wt. %)=(0.79×number of ml MeOH/ 0.79×number of ml MeOH+50)×100

As mentioned above, the oxidic or siliceous fillers to be rendered hydrophobic possess a certain water content. This water content can be adjusted by drying the oxidic and/or siliceous filler at elevated temperature, generally 80 to 250° C., optionally under vacuum, until the desired water content is achieved, prior to making it hydrophobic. Obviously it is also possible to treat the oxidic or siliceous filler with the sulfur adduct at the temperatures mentioned above, wherein the physically bonded water is also removed from the oxidic or siliceous filler. The oxidic and/or siliceous filler to be rendered hydrophobic is preferably dried until the desired water content is achieved prior to treatment with the sulfur adduct.

The content of physically bonded water in this connection is understood to be the loss on drying the oxidic or siliceous filler used at 105° C. for 2 hours in accordance with DIN ISO 787/2 (previously DIN 53 198).

The hydrophobic, oxidic or siliceous fillers are preferably obtained by treating with 5 to 25 parts by weight, per 100 parts by weight of filler, of a sulfur adduct mentioned above. Treatment of the fillers used according to the invention with the sulfur adducts may be performed at temperatures from above room temperature to below the decomposition temperature of the particular sulfur adduct used. Treatment of the oxidic or siliceous filler, optionally adjusted to a specific water content, with the sulfur adducts may be regarded as complete when the theoretical amount of sulfur adduct can no longer be extracted using a suitable solvent and the wettability with water of the treated filler has become substantially poorer. Treatment may also be terminated, however, before complete reaction as soon as the water-repellence of the filler is within the desired range.

As mentioned above, the hydrophobic, oxidic or siliceous fillers according to the invention have a specific methanol wettability, wherein the methanol wettability gives the wt. % of methanol in a methanol/water mixture which is capable of just wetting the treated filler. Determination of the methanol wettability has been described above.

Treatment of the oxidic or siliceous filler used with the sulfur adduct can be performed in the presence of a suitable solvent and/or diluent and in the presence of suitable catalysts. The most appropriate amount of solvent and/or diluent and the most appropriate amount of catalyst to be used in a particular case can be determined in appropriate preliminary trials.

The following may be used as solvent and/or diluent: aliphatic or aromatic hydrocarbons, e.g. cyclohexane, xylene, mineral oil.

The sulfur adducts used for treatment may be obtained in a known manner by reacting sulfur and/or sulfur-providing compounds, such as dialkyl polysulfides, such as e.g. dioctyl polysulfides, diamino polysulfides or dichloro polysulfides, with unsaturated primary or secondary alcohols with 3 to 60 carbon atoms, preferably 6 to 36 carbon atoms.

One to 6 moles of sulfur or sulfur-providing compounds per mole of double bond in the alcohol are preferably used during preparation of the sulfur adducts. When using sulfur-providing compounds, the amount used refers to the reactive sulfur.

The reaction of sulfur and/or sulfur-providing compounds with the primary and/or secondary alcohols mentioned above is usually performed at temperatures of 100 to 160° C., preferably 120 to 150° C., optionally under pressure at 1 to 12 bar, preferably 1 to 6 bar, optionally in the presence of a catalyst such as hydrogen sulfide, disulfur dichloride or amines. These types of sulfur addition reactions with unsaturated compounds are known. In this connection, reference is made to EP 531 842.

The most suitable amount of catalyst to use for the sulfur addition reaction with the unsaturated alcohols mentioned can also be readily determined by appropriate preliminary trials and is conventionally 0.1 to 5 wt. %, with respect to the unsaturated alcohol.

The oxidic and/or siliceous fillers used are those oxidic or siliceous fillers which occur naturally or can be obtained by synthetic processes, and which can react by esterification with the sulfur adducts used due to the presence of hydroxyl or oxide groups at the surface.

Oxidic or siliceous fillers which are preferably rendered hydrophobic in the reaction according to the invention are those which have a pH of 3 to 12, preferably 4 to 8.

Highly dispersed silicas are particularly preferred, e.g. those prepared by precipitation from solutions of silicates or by flame hydrolysis of silicon halides with specific surface areas of 5 to 1000, preferably 20 to 400 $m^2/g$ (BET surface area) and with primary particle sizes of 10 to 400 nm. The silicas may also be present as mixed oxides with other metal oxides such as aluminium, magnesium, calcium, barium, zinc, zirconium or titanium oxides. Furthermore, synthetic silicates such as aluminium silicate, alkaline earth silicates such as magnesium silicate and/or calcium silicate, with BET surface areas of 20 to 400 $m^2/g$ with primary particle diameters of 10 to 400 nm are also preferred. Furthermore, natural silicates such as kaolin and other naturally occurring silicas, metal hydroxides such as aluminium hydroxide and magnesium hydroxide. Precipitated silicas and/or precipitated silicates with 20 to 400 $m^2/g$ (BET surface area) and with primary particle sizes of 10 to 400 nm are quite particularly preferred.

The unsaturated primary and/or secondary alcohols used may contain hydrocarbon chains which are interrupted by ester groupings, oxygen atoms, sulfur atoms or by amino groupings or may be substituted by alkyl, alkyl-aryl or arylamino groups with 1 to 18 carbon atoms, by further hydroxyl groups, carboxylic acid groups and their salts, by fluorine, chlorine or bromine atoms and by $C_1$ to $C_{18}$ alkyl or aryl esters of carboxylic acids, amino groups or by alkyl-aryl or arylamino groups with 1 to 18 carbon atoms. Particularly preferred unsaturated primary and/or secondary alcohols are: allyl alcohol, propargyl alcohol, 1,4-butenediol, 2-methylene-1,3-propanediol, 2-hexene-1-ol, 5-hexene-1,2-diol, 1,5-hexadiene-3,4-diol, 3-cyclohexene-1,1-di-methanol, 1-octene-3-ol, undecenyl alcohol, dodecenyl alcohol, hexadecenol, oleyl alcohol, ricinoleic acid, castor oil, cinnamyl alcohol, hydroxyethyl (meth)acrylate, 4-hyroxybutyl (meth)acrylate.

The unsaturated alcohols mentioned above may be used individually, as mixtures or also mixed with saturated and/or unsaturated compounds which do not contain hydroxyl groups which then optionally do not contribute to the reaction with sulfur and are merely bonded to the fillers used in a physical manner. Examples of such saturated and/or unsaturated compounds are: silicone oils, paraffin oils, mineral oils and unsaturated hydrocarbons such as natural vegetable unsaturated oils such as soy oil, olive oil, sunflower oil, isobutylene, diisobutylene, tetrapropylene, dodecene-1, heptadecene-7 and eicosene.

Obviously it is also possible to use other known hydrophobic agents for further modification of the oxidic and/or siliceous fillers used in addition to the sulfur adducts used to treat the oxidic and/or siliceous fillers. The following may be mentioned as examples of these types of compounds: polysulfidic silylethers, such as bis-(triethoxysilylpropyl) tetrasulfide, polydimethylsiloxanes which may optionally contain further SiOH groups, octamethylcyclotetrasiloxane, hexamethyldisilazane, vinylsilanes such as triethoxyvinylsilane, alkylsilanes such as octyltriethoxysilane and octadecyltriethoxysilane, aminosilanes such as 3-aminopropyltriethoxysilane.

The present invention also provides the use of hydrophobic oxidic and/or siliceous fillers prepared according to the invention for producing rubber mixtures.

Rubbers which are suitable, individually or combined with each other, for mixing with the hydrophobic fillers are natural rubbers and also all known synthetic rubbers. Preferred synthetic rubbers are described for example in W. Hoffman, Kautschuk-technologie, Gentner Verlag, Stuttgart 1980. They include, inter alia,

| | |
|---|---|
| BR | polybutadiene |
| ABR | butadiene/$C_1$–$C_4$-alkylacrylate copolymers |
| CR | polychloroprene |
| IR | polyisoprene |
| SBR | styrene/butadiene copolymers with styrene concentrations of 1 to 60, preferably 20 to 50 wt. % |
| IIR | isobutylene/isoprene copolymers |
| NBR | butadiene/acrylonitrile copolymers with acrylonitrile concentrations of 5 to 60, preferably 10 to 40 wt. % |
| HNBR | partly or completely hydrogenated NBR rubber |
| EPDM | ethylene/propylene/diene copolymers | and mixtures of these rubbers. Of particular interest for the production of vehicle tyres containing surface-modified fillers are, in particular, natural rubber, emulsion SBR and solution SBR rubbers with a glass transition temperature above −50° C., which may optionally be modified with silylethers or other functional groups, as described in e.g. EP-A 447 066, polybutadiene rubber with a high 1,4-cis content (>90%) which is prepared using catalysts based on Ni, Co, Ti or Nd and polybutadiene rubber with a vinyl concentration of 0 to 75% and mixtures of these.

In addition to the activated and hydrophobic, oxidic and/or siliceous fillers according to the invention, the rubber mixtures may also contain other fillers. These include carbon black in addition to untreated oxidic and/or siliceous fillers. Preferred further fillers are e.g.:

highly dispersed silicas prepared e.g. by precipitation of silicates or flame hydrolysis of silicon halides with specific areas of 5 to 1000, preferably 20 to 400 $m^2/g$ (BET surface area) and with primary particle sizes of 10 to 400 nm. The silicas may optionally be present as mixed oxides with other metal oxides such as Al, Mg, Ca, Ba, Zn, Zr or Ti oxides, synthetic silicates such as aluminium silicate, alkaline earth silicates such as magnesium silicate or calcium silicate with BET surface areas of 20 to 400 $m^2/g$ and primary particle diameters of 10 to 400 nm, natural silicates such as kaolin and other naturally occurring silicas, glass fibres and glass fibre products (mats, ropes) or microglass beads, metal oxides such as zinc oxide, calcium oxide, magnesium oxide, aluminium oxide, metal carbonates, such as magnesium carbonate, calcium carbonate, zinc carbonate, metal hydroxides, such as e.g. aluminium hydroxide, magnesium hydroxide, rubber gels, carbon blacks.

The carbon blacks which may be used are prepared by the lamp black, furnace black or glass-carbon black method and have BET surface areas of 20 to 200 $m^2/g$, such as e.g. SAF, ISAF, HAF, FEF or GPF carbon blacks.

Highly dispersed precipitated silicas and carbon blacks are particularly preferably used. The fillers mentioned may be used individually or as mixtures, wherein the most suitable mixing ratio can be determined by preliminary trials.

The fillers prepared according to the invention may be mixed into the rubbers mentioned above in a conventional manner, for example with the assistance of rollers, internal mixers and mixer extruders.

In accordance with another variant, the fillers according to the invention may be mixed with a solution of a rubber in an organic solvent and the solvent may then be removed. The solvent is preferably driven out using steam. The rubber solutions may have a concentration of solid rubber of 5 to 40 wt. %, preferably 10 to 30 wt. %, with respect to the total amount of organic solvent used.

Preferred organic solvents are aliphatic and/or cycloaliphatic hydrocarbons with 4 to 12 carbon atoms, such as pentane, hexane, cyclohexane, heptane, octane, benzene, toluene and/or xylene. The most appropriate amount of solvent to use can easily be determined by suitable preliminary trials.

The amount of hydrophobic siliceous and/or oxidic fillers used according to the invention is 20 to 150 parts by weight, preferably 40 to 100 parts by weight, of filler per 100 parts by weight of rubber used.

Obviously it is possible to add other known fillers, stabilisers, processing aids and filler activators to the rubber mixtures containing fillers according to the invention. The following may be mentioned, for example, bis-(triethoxysilylpropyl) tetrasulfide, 3-thiocyanatopropyltriethoxysilane or compounds like the ones described in EP-A 466 066 or EP-A 670 347.

In addition the rubber mixtures may also contain rubber auxiliary products such as reaction accelerators, anti-ageing agents, thermal stabilisers, light protective agents, ozone protective agents, processing aids, plasticisers, tackifiers, blowing agents, colorants, pigments, waxes, extenders, activators and/or vulcanisation delayers, which are known in the rubber industry.

The additives or rubber auxiliary products which are added may be used in amounts of up to 70 wt. % with respect to the rubber used. The amount of additives is governed by the particular final use of the rubber mixtures.

Due to the concentration of bonded sulfur, the oxidic and/or siliceous fillers according to the invention may also be used on their own as cross-linking agents during vulcanisation. Obviously it is also possible to add known sulfur cross-linking agents and/or peroxidic cross-linking agents to the rubber mixtures, in amounts which are also known, optionally with suitable vulcanisation accelerators. The vulcanisation accelerators and the cross-linking agents are generally added in amounts of 0.1 to 10 wt. %, preferably 0.1 to 5 wt. %, with respect to the rubber used. Vulcanisation may be performed in a conventional manner, e.g. at temperatures of 100 to 200° C., optionally under a pressure of 10 to 200 bar.

The rubber mixtures according to the invention may be used to prepare rubber vulcanisates which are then used to produce moulded items of all types, e.g. for the production of cable sheathing, hoses, transmission belts, conveyor belts, roller coatings, tyres, shoe soles, sealing rings and shock absorbers.

The costs of raw materials are greatly reduced by using hydrophobic siliceous and/or oxidic fillers according to the invention as compared with known silica/silane filler systems. In addition the rheological properties of the rubber mixtures (low mixing viscosity, low die swelling) and a much more favourable dynamic damping behaviour (less heat built up, lower rolling resistance) is achieved by using the rubber vulcanisates prepared therewith. In addition rubber vulcanisates prepared with the hydrophobic oxidic and/or siliceous fillers according to the invention show improved ageing behaviour under thermal and dynamic loads (reversion resistance), associated with high abrasion resistance.

EXAMPLES

Example 1a)

Adduct of Sulfur and Oleyl Alcohol 0.8 g of disulfur dichloride were added to 134.3 g (0.5 mol) of oleyl alcohol and 64.1 g (2 mol) of sulfur at 150° C. with stirring. The mixture was then stirred for 2 hours at this temperature under a slightly reduced pressure (800 mbar). The crude product was cooled to room temperature and then 200 ml of absolute ethanol were added. After 14 hours the precipitated sulfur was filtered off and the ethanol removed under vacuum. 188.3 g of a yellow-brown oil with a sulfur content of 28.2 wt. % and viscosity of 1 Pa.s. were obtained.

Example 1b)

Activated and Hydrophobic Silica 250 g of Vulkasil S (precipitated silica with a BET surface area of 180 $m^2/g$, loss on drying in accordance with DIN 787/2 5–6 wt. %, Bayer AG) were heated with stirring for 3.5 hours at 130° C. in a distillation apparatus, wherein 12 ml of water were removed. Concentration of physically bonded water: <0.5%. Then 44.1 g of the sulfur adduct from example I a) was added dropwise over the course of 1 hour at 150° C. and the mixture was then stirred for a further 1 hour. 273 g of a light coloured powder with a methanol wettability of 23 wt. % were obtained.

Example 1c)

Activated and Hydrophobic Silica 4 kg of precipitated silica Vulkasil S (Bayer AG, BET surface area 180 m²/g, loss on drying in accordance with DIN 787/2 5–6 wt. %) were heated in 40 l vessel with stirring for 6 hours at 200° C. During this time 200 g of water were distilled off. Then the silica was cooled to 140° C. and 600 g of the adduct of oleylalcohol and sulfur from example 1a were added with stirring. The mixture was then stirred for further 3 hours. 4.38 kg of an activated and hydrophobic silica were obtained with a methanol wettability of 20 wt. % and a drying loss after 2 hours at 105° C. of 1.5 wt. %.

Example 2a)

Adduct of Sulfur and Undecenyl Alcohol 167.7 g of 10-undecene-1-ol and 78 g of sulfur were heated with stirring for 18 hours at 150° C. After degassing under a slight vacuum, 244.2 g of a brown viscous oil with a sulfur concentration of 32 wt. % were obtained.

Example 2b)

Activated and Hydrophobic Silica 500 g of Vulkasil S (precipitated silica with a BET surface area of 180 m²/g, Bayer AG) and 75 g of the adduct from example 2a) were heated together, with stirring, for 14 hours at 140° C. (oil bath temperature), wherein water distilled off. The mixture was then degassed at about 75° C. for 30 minutes by applying a vacuum of 200 mbar. 557 g of a pale brown powder were obtained. The silica treated in this way had a methanol wettability of 6 wt. %. Water content <1% (loss on drying after 2 hours at 105° C.).

Example 3 (Comparison Example)

500 g of Vulkasil S (precipitated silica with a BET surface area of 180 m²/g, loss on drying in accordance with DIN 787/2 5–6 wt. %, Bayer AG) were heated under stirring for 5 hours at 1 50° C. in a distillation apparatus. 75 g of 2,2-bis(hydroxyethyl) tetrasulfide (HO—CH₂CH₂—S₄—CH₂CH₂—OH) were added dropwise over the course of 1 hour and the mixture was then stirred at 150° C. for a further hour. 554 g of a pale coloured powder were obtained. The silica produced in this way was not hydrophobic but was immediately wetted by water (methanol wettability 0 wt. %).

Example 4 (Comparison Example)

50 g of Vulkasil S were mixed with 8.82 g of the sulfur adduct in accordance with example 1a) at 50° C. with vigorous stirring. The silica treated in this way (water content 5 wt. %) is not hydrophobic but is immediately wetted by water.

Example 5

The following rubber mixtures were prepared in a 1.5 l internal mixer at 130° C. Sulfur and accelerator were added afterwards on a roller at 50° C.

| Ingredients (parts by weight) | A | B | C |
|---|---|---|---|
| L-SBR rubber Buna VSL 5025-1 (Bayer AG) | 96 | 96 | 96 |
| BR rubber Buna CB 24 (Bayer AG) | 30 | 30 | 30 |
| Unmodified silica (Vulcasil S, Bayer AG) | 80 | 80 | 0 |
| Silica according to example 1b | 0 | 0 | 80 |
| Carbon black Corax 339 (Degussa) | 6.5 | 6.5 | 6.5 |
| Aromatic oil | 8 | 8 | 8 |
| Zinc oxide | 2.5 | 2.5 | 2.5 |
| Stearic acid | 1 | 1 | 1 |
| Antioxidant Vulkanox 4020 (Bayer) | 1 | 1 | 1 |
| Ozone protective wax Antilux 654 (Rheinchemie) | 1.5 | 1.5 | 1.5 |
| Bis-(triethoxysilylpropyl) tetrasulfide Si 69 (Degussa) | 0 | 6.5 | 0 |
| Sulfur | 1.5 | 1.5 | 1.5 |
| Accelerator Vulkacit CZ (Bayer AG) | 1.5 | 1.5 | 1.5 |
| Accelerator Vulkacit D (Bayer AG) | 2 | 2 | 2 |
| Mixing viscosity ML 1–4 (100° C.) | 148 | 92 | 74 |
| The rubber mixtures were then vulcanised at 150° C. The vulcanisation times were: | 35 min | 35 min | 45 min |
| Properties of the vulcanisate | | | |
| Modulus at 100% extension (MPa) | 2.8 | 3.6 | 4.1 |
| Shore A hardness at 23° C. | 83 | 72 | 74 |
| Shore A hardness at 70° C. | 77 | 69 | 71 |
| Tensile strength (MPa) | 17.3 | 19.9 | 17 |
| Elongation at break (%) | 670 | 380 | 430 |
| rebound elasticity (%) at 70° C. | 48 | 53 | 56 |
| Abrasion (ccm) according to DIN 53516 | 109 | 87 | 90 |

In addition to the improved processing behaviour of the unvulcanised rubber mixtures which is demonstrated by the low Mooney viscosity, the vulcanisate properties when using surface-modified fillers according to the invention demonstrate advantages with respect to dynamic damping at 70° C., which from experience correlates with low rolling resistance of vehicle tyres. Vulcanisates which are produced using surface-modified fillers according to the invention also have considerably lower raw material costs since they also have a very good set of mechanical properties without the use of an expensive silane.

Example 6

The following substances were mixed in a 1.5 l internal mixer (70 r.p.m, filling 65 vol %, starting temperature 50° C., mixing time 5 minutes). After the first mixing cycle the mixtures were dumped, cooled at room temperature and treated once again under the same conditions in the internal mixer. After this procedure sulfur and accelarator were added to the compounds on a roller mill at 50° C. Then the compounds were vulcanised at 160° C.

| Ingredients (parts by weight) | A | B |
|---|---|---|
| mixed in the internal mixer: | | |
| Solution-SBR Buna VSL 5025-1 (Bayer AG) | 96 | 96 |
| Polybutadiene-rubber Buna CB 24 (Bayer AG) | 30 | 30 |
| precipitated silica Vulkasil S (Bayer AG) | 80 | 0 |
| silica according to example 1c | 0 | 88 |
| carbon black Corax N 339 (Degussa) | 6.6 | 6.5 |
| stearic acid | 1 | 1 |
| zinkoxide RS (Bayer AG) | 2.5 | 2.5 |
| aromat. mineraloil Renopal 450 (Fuchs) | 8 | 8 |
| antioxidant Vulkanox 4020 (Bayer AG) | 1 | 1 |
| antioxidant Vulkanox HS (Bayer AG) | 1 | 1 |

-continued

| Ingredients (parts by weight) | A | B |
|---|---|---|
| Bis-(triethoxisilylpropyl)-tetrasulfid Si 69 (Degussa) | 6.5 | 0 |
| ozone protective wax Antilux 654 (Rheinchemie) | 1.5 | 1.5 |
| added on the roller mill at 50° C.: | | |
| sulfenamide accelerator Vulkacit CZ (Bayer AG) | 1.5 | 1.5 |
| guanidine accelerator Vulkacit D (Bayer AG) | 2 | 2 |
| sulfur | 1.5 | 1.5 |
| viscosity of the compound ML 1 + 4 (100° C.) | 105 | 81 |
| Vulcanisation at 160° C.: vulcanisation time: | 45 minutes | 55 minutes |
| Properties of the vulcanisate: | | |
| Modulus at 100% extension (MPa) | 3.6 | 4.3 |
| Modulus at 300% extension (Mpa) | 14.6 | 12.5 |
| Tensile strength (Mpa) | 16.8 | 18 |
| Elongation at break (%) | 332 | 430 |
| Hardness at 23° C. (Shore A) | 72 | 75 |
| rebound elasticity at 23° C. (Shore A) | 28 | 25.5 |
| rebound elasticity at 70° C. (%) | 51.6 | 54.7 |
| tan delta at 0° C. (according to Roelig) | 0.475 | 0.537 |
| tan delta at 60° C. (according to Roelig) | 0.124 | 0.101 |

The example according to the invention exhibits improved processing behaviour (lower viscosity of the compound) as well as better dynamic damping behaviour (higher dynamic damping at 0° C. for better wet traction, lower dynamic damping at 60° C. for lower rolling resistance in tires, measured as tan delta).

What is claimed is:

1. A hydrophobic oxidic and/or siliceous filler comprising an oxidic and/or siliceous filler treated with 0.1 to 50 parts by weight per 100 parts by weight of filler, of an adduct of sulfur and unsaturated primary and/or secondary alcohols with 3 to 60 carbon atoms at temperatures of 20 to 250° C., wherein said adduct is obtained by reacting 1 to 10 moles of sulfur and/or a sulfur-providing compound with each mole of double bonds in said alcohols.

2. A hydrophobic oxidic and/or siliceous filler according to claim 1, wherein said adduct has a concentration of physically-bonded water of $\leq 4$ wt. % with respect to the total amount of filler.

3. A hydrophobic oxidic and/or siliceous filler according to claim 1, wherein said adduct has a concentration of bonded sulfur of 10 to 65 wt. %.

4. A hydrophobic oxidic and/or siliceous filler according to claim 1, wherein said oxidic and/or siliceous filler has a methanol wettability of 1 to 55 wt. %, wherein the methanol wettability is defined as follows:

$$\text{Methanol wettability (in wt \%)} = (0.79 \times \text{number of ml MeOH}/0.79 \times \text{number of ml MeOH} + 50) \times 100.$$

5. A rubber mixture comprising at least one rubber compound mixed with hydrophobic oxidic and/or siliceous fillers which comprise oxidic and/or siliceous fillers treated with 0.1 to 50 parts by weight per 100 parts by weight of filler, of an adduct of sulfur and unsaturated primary and/or secondary alcohols with 3 to 60 carbon atoms at temperatures of 20 to 250° C., wherein said adduct is obtained by reacting 1 to 10 moles of sulfur and/or a sulfur-providing compound with each mole of double bonds in said alcohols.

* * * * *